United States Patent [19]
Medford

[11] Patent Number: 5,625,977
[45] Date of Patent: May 6, 1997

[54] FISHING LURE PROTECTIVE DEVICE

[76] Inventor: Paul E. Medford, 411 Lakewood, Waxahachie, Tex. 75165

[21] Appl. No.: 539,081

[22] Filed: Oct. 4, 1995

[51] Int. Cl.$^6$ ........................................ A01K 97/06
[52] U.S. Cl. ........................................ 43/57.1; 43/25.2
[58] Field of Search ........................ 43/25.2, 54.1, 43/57.1; D22/134, 144; 206/315.11

[56] References Cited

U.S. PATENT DOCUMENTS

| | | | |
|---|---|---|---|
| 2,767,502 | 10/1956 | Reynolds | 43/57.1 |
| 2,849,825 | 9/1958 | Reisner | 43/57.1 |
| 2,963,815 | 12/1960 | Carpenter | 43/57.1 |
| 4,015,361 | 4/1977 | O'Reilly | 43/25.2 |
| 5,235,775 | 8/1993 | Daughtry | 43/25.2 |

FOREIGN PATENT DOCUMENTS 8911791  12/1989  WIPO ....................... D22/144

*Primary Examiner*—Kurt Rowan

[57] ABSTRACT

An upper housing portion having a closed upper end and an open lower end. The upper housing portion has a front wall, a rear wall and two side walls. The upper housing portion has a trapezoidal configuration with the open lower end having a greater width than the closed upper end. The upper housing portion has a tail portion extending at an angle outwardly from the rear wall thereof. The device contains a lower housing portion having an open upper end and a closed lower end. The lower housing portion has a front wall, a rear wall and two side walls. The lower housing portion has a trapezoidal configuration with the open upper end having a greater width than the closed lower end. The lower housing portion has a tail portion extending at an angle outwardly from the rear wall thereof. The lower housing portion and the upper housing portion together form a lure protecting cavity when in a closed, cooperating relationship. A spring mechanism is secured to the coupled together upper housing portion and the lower housing portion between the tail portions thereof whereby the spring mechanism biasing the upper housing portion and the lower housing portion together to form the lure protecting cavity.

6 Claims, 3 Drawing Sheets

FISHING LURE PROTECTIVE DEVICE

BACKGROUND OF THE INVENTION

1. Field of the Invention

The present invention relates to a new and improved fishing lure protective device and, more particularly, pertains to protecting a fishing lure when not in use.

2. Description of the Prior Art

The use of fish hook holder is known in the prior art. More specifically, fish hook holder heretofore devised and utilized for the purpose of holding a fish hook are known to consist basically of familiar, expected, and obvious structural configurations, notwithstanding the myriad of designs encompassed by the crowded prior art which has been developed for the fulfillment of countless objectives and requirements.

The prior art discloses a large number of fish hook holder. By way of example, U.S. Pat. No. 5,233,783 to Roebuck et. al discloses a fish hook and lure protector.

U.S. Pat. No. 4,936,040 to Reiter et al. discloses a lure container.

U.S. Pat. No. Des. 302,629 to Luckritz discloses the ornamental design for a fish hook holder.

U.S. Pat. No. 4,067,134 to Billings discloses a fishing line holder.

U.S. Pat. No. 4,879,832 to Nelson discloses a fishing lure/hook receptacle.

U.S. Pat. No. 4,884,357 to Clifford discloses a fish hook carrier.

Lastly, U.S. Pat. No. 4,015,361 to O'Reilly et al. discloses a fish hook retainer.

In this respect, the fishing lure protective device according to the present invention substantially departs from the conventional concepts and designs of the prior art, and in doing so provides an apparatus primarily developed for the purpose of protecting a fishing, lure when not in use.

Therefore, it can be appreciated that there exists a continuing need for a new and improved fishing lure protective device which can be used for protecting a fishing lure when not in use. In this regard, the present invention substantially fulfills this need.

SUMMARY OF THE INVENTION

In view of the foregoing disadvantages inherent in the known types of fish hook holder now present in the prior art, the present invention provides a new and improved fishing lure protective device. As such, the general purpose of the present invention, which will be described subsequently in greater detail, is to provide a new and improved fishing lure protective device and methods which have all the advantages of the prior art and none of the disadvantages.

To attain this, the present invention essentially comprises an upper housing portion having a closed upper end and an open lower end. The upper housing portion has a front wall, a rear wall and two side walls. The upper housing portion has a trapezoidal configuration with the open lower end having a greater width than the closed upper end. The upper housing portion has apertures formed through the side walls thereof inwardly of the front wall. The apertures resemble eyes of a fish. The closed upper end has an elongated inscription thereon resembling a dorsal fin of a fish. The upper housing portion has a tail portion extending at an angle outwardly from the rear wall thereof. The upper housing portion has an arcuate recess formed in a lower edge of the front wall. The device contains a lower housing portion having an open upper end and a closed lower end. The lower housing portion has a front wall, a rear wall and two side walls. The lower housing portion has a trapezoidal configuration with the open upper end having a greater width than the closed lower end. The lower housing portion has fins inscribed on the side walls thereof. The lower housing portion has a tail portion extending at an angle outwardly from the rear wall thereof. The lower housing portion has an arcuate recess formed in an upper edge of the front wall. The lower housing portion and the upper housing portion together form a lure protecting cavity when in a closed, cooperating relationship. The device contains a spring mechanism having an upper arm and a lower arm. The spring mechanism is secured to the coupled together upper housing portion and the lower housing portion between the tail portions thereto with the upper arm secured to an upper surface of the tail portion of the upper housing portion and the lower arm secured to a lower surface of the tail portion of the lower housing portion whereby the upper arm and the lower arm biasing the upper housing portion and the lower housing portion together to form the lure protecting cavity.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing lure protective device which has all the advantages of the prior art fish hook holder and none of the disadvantages.

It is another object of the present invention to provide a new and improved fishing lure protective device which may be easily and efficiently manufactured and marketed.

It is a further object of the present invention to provide a new and improved fishing lure protective device which is of a durable and reliable construction.

An even further object of the present invention is to provide a new and improved fishing lure protective device which is susceptible of a low cost of manufacture with regard to both materials and labor, and which accordingly is then susceptible of low prices of sale to the consuming public, thereby making such a fishing lure protective device economically available to the buying public.

Still yet another object of the present invention is to provide a new and improved fishing lure protective device which provides in the apparatuses and methods of the prior art some of the advantages thereof, while simultaneously overcoming some of the disadvantages normally associated therewith.

Even still another object of the present invention is to protecting a fishing lure when not in use.

Lastly, it is an object of the present invention to provide an upper housing portion having a closed upper end and an open lower end. The upper housing portion has a front wall, a rear wall and two side walls. The upper housing portion has a trapezoidal configuration with the open lower end having a greater width than the closed upper end. The upper housing portion has a tail portion extending at an angle outwardly from the rear wall thereof. The device contains a lower housing portion having an open upper end and a closed lower end. The lower housing portion has a front wall, a rear wall and two side walls. The lower housing portion has a trapezoidal configuration with the open upper end having a greater width than the closed lower end. The lower housing portion has a tail portion extending at an angle outwardly from the rear wall thereof. The lower housing portion and the upper housing portion together form a lure protecting cavity when in a closed, cooperating relationship. A spring mechanism is secured to the coupled together upper housing portion and the lower housing portion between the tail portions thereof whereby the spring mechanism biasing the upper housing portion and the lower housing portion together to form the lure protecting cavity.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
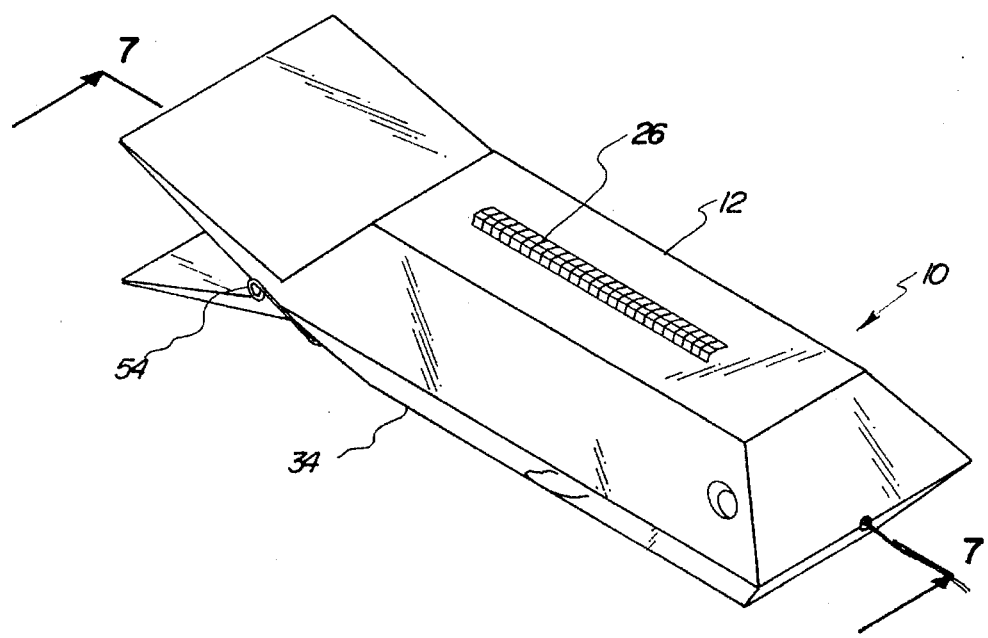
FIG. 1 is a perspective illustration of the preferred embodiment of the fishing lure protective device constructed in accordance with the principles of the present invention.
Figure 2:
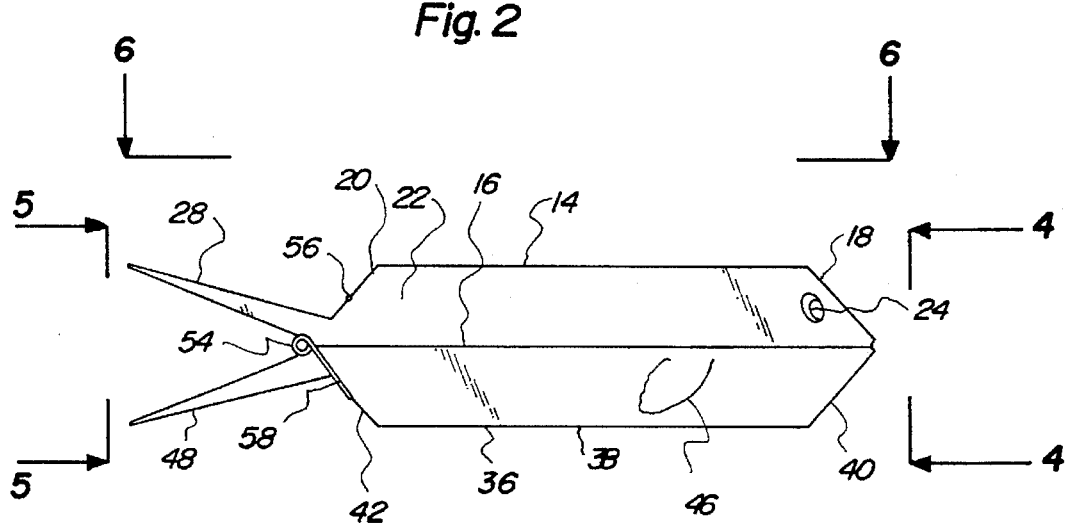
FIG. 2 is a side elevation view of the present invention.
Figure 3:
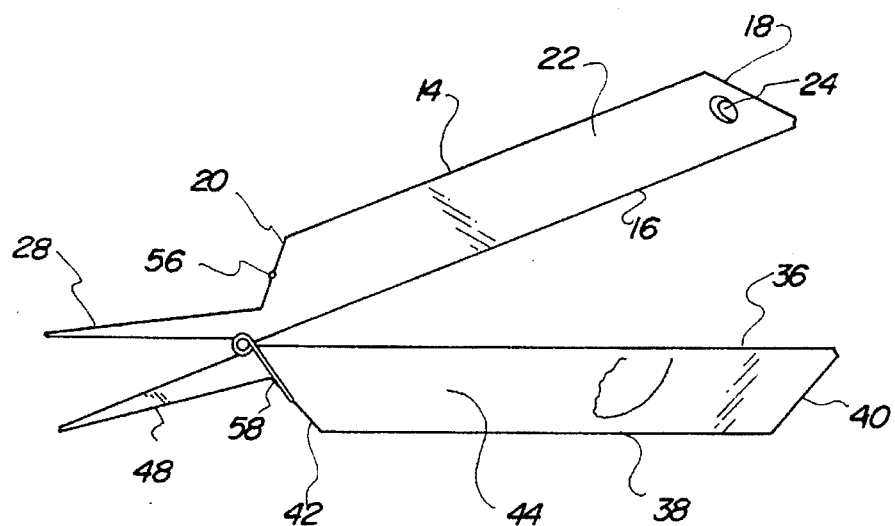
FIG. 3 is a side elevation view of the present invention is an open configuration.
Figure 4:
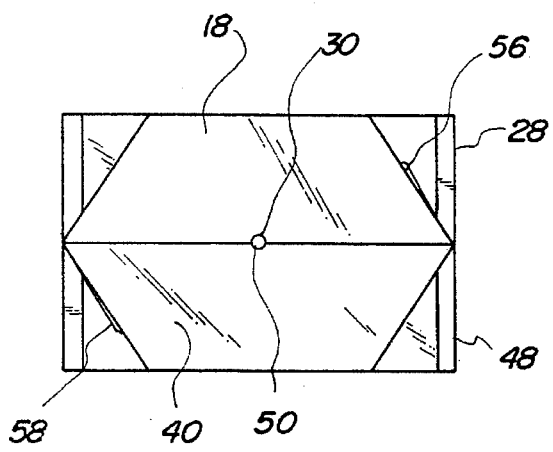
FIG. 4 is a cross-sectional view as taken along line 4—4 of FIG. 2.
Figure 5:
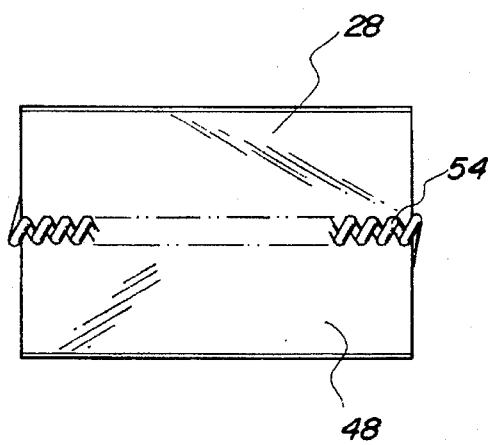
FIG. 5 is a cross-sectional view as taken along line 5—5 of FIG. 2.
Figure 6:
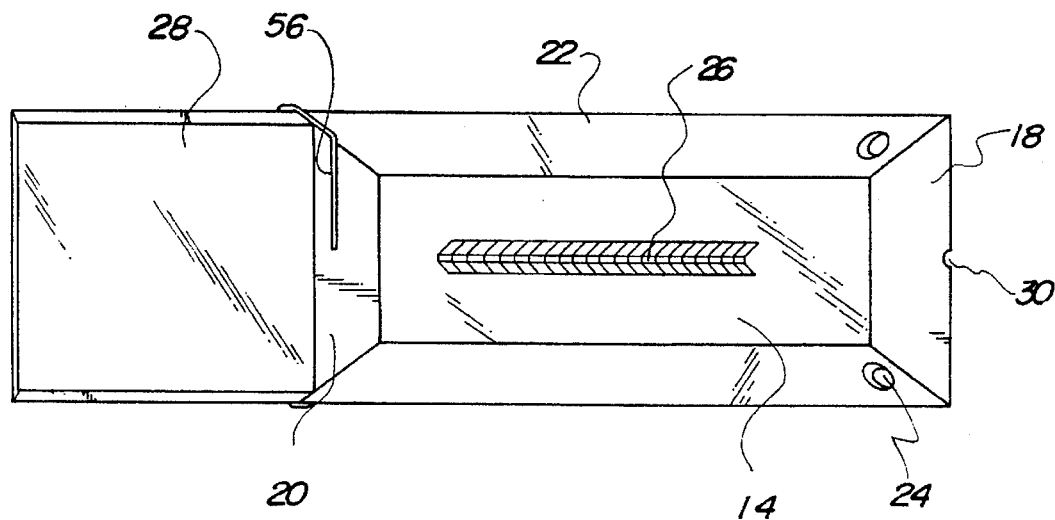
FIG. 6 is a cross-sectional view as taken along line 6—6 of FIG. 2.
Figure 7:
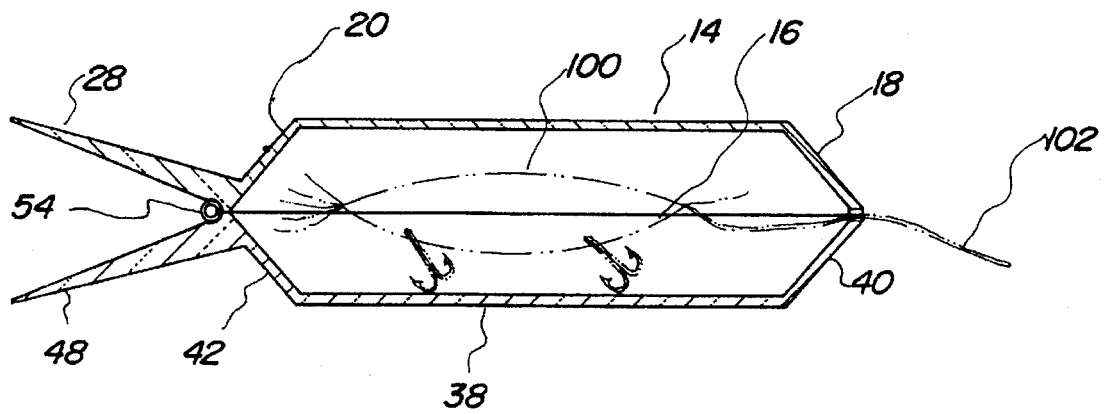
FIG. 7 is a cross-sectional view as taken along line 7—7 of FIG. 1.

With reference now to the drawings, and in particular to FIGS. 1 through 7 thereof, the preferred embodiment of the new and improved fishing lure protective device embodying the principles and concepts of the present invention and generally designated by the reference numeral 10 will be described.

The present invention, the new and improved fishing lure protective device is a system 10 comprised of a plurality of components. Such components, in their broadest context, include an upper housing portion, a lower housing portion, and a spring mechanism. Each of the individual components is specifically configured and correlated one with respect to the other so as to attain the desired objectives.

The device 10 contains an upper housing portion 12 having a closed upper end 14 and an open lower end 16. The upper housing portion 12 has a front wall 18, a rear wall 20 and two side walls 22. The upper housing portion 12 has a trapezoidal configuration with the open lower end 16 having a greater width than the closed upper end 14. The upper housing portion 12 has apertures 24 formed through the side walls 22 thereof inwardly of the front wall 18. The apertures 24 resemble eyes of a fish. The closed upper end 14 has an elongated inscription 26 thereon resembling a dorsal fin of a fish. The upper housing portion 12 has a tail portion 28 extending at an angle outwardly from the rear wall 20 thereof. The upper housing portion 12 has an arcuate recess 30 formed in a lower edge of the front wall 18. The upper housing portion 12 is preferably four inches in length across the closed upper end 14 and five inches across the open lower end 16. The tail portion 28 is about one and one-half inches in length. The tail portion 28 is at an angle greater than forty-five degrees from the upper housing portion 12. The upper housing portion 12 is preferably constructed of a rigid plastic, but other suitable materials could be used. Different sizes of the device 10 could also be constructed in a variety of colors and designs.

The device 10 contains a lower housing portion 34 having an open upper end 36 and a closed lower end 38. The lower housing portion 34 has a front wall 40, a rear wall 42 and two side walls 44. The lower housing portion 34 has a trapezoidal configuration with the open upper end 36 having a greater width than the closed lower end 38. The lower housing portion 34 has fins 46 inscribed on the side walls 44 thereof. The lower housing portion 34 has a tail portion 48 extending at an angle outwardly from the rear wall 42 thereof. The lower housing portion 32 has an arcuate recess 50 formed in an upper edge of the front wall 40. The lower housing portion 34 and the upper housing portion 12 together form a lure protecting cavity when in a closed, cooperating relationship. The lower housing portion 34 is of the same geometric dimensions and construction as the upper housing portion 12. When the upper housing portion 12 and the lower housing portion are closed together, a lure 100 can be held therein with the fishing line 102 connected to the lure 100 extending outwardly of the coupled together arcuate recesses 30, 50 thereof. Different sized devices 10 could be employed to cooperate with different sized lures.

The device 10 contains a spring mechanism 54 having an upper arm 56 and a lower arm 58. The spring mechanism 54 is secured to the coupled together upper housing portion 12 and the lower housing portion 34 between the tail portions 28, 48 thereof with the upper arm 56 secured to an upper surface of the tail portion 28 of the upper housing portion 12 and the lower arm 58 secured to a lower surface of the tail portion 48 of the lower housing portion 34 whereby the upper arm 56 and the lower arm 58 biasing the upper housing portion 12 and the lower housing portion 34 together to form the lure protecting cavity.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved fishing lure protective device comprising, in combination:

an upper housing portion having a closed upper end and an open lower end, the upper housing portion having a front wall, a rear wall and two side walls, the open lower end having a greater width than the closed upper end, the upper housing portion having apertures formed through the side walls thereof inwardly of the front wall, the apertures resembling eyes of a fish, the closed upper end having an elongated inscription thereon resembling a dorsal fin of a fish, the upper housing portion having a tail portion extending at an angle outwardly from the rear wall thereof, the upper housing portion having an arcuate recess formed in a lower edge of the front wall;

a lower housing portion having an open upper end and a closed lower end, the lower housing portion having a front wall, a rear wall and two side walls, the open upper end having a greater width than the closed lower end, the lower housing portion having fins inscribed on the side walls thereof, the lower housing portion having a tail portion extending at an angle outwardly from the rear wall thereof, the lower housing portion having an arcuate recess formed in an upper edge of the front wall, the lower housing portion and the upper housing portion forming a lure protecting cavity when in a closed, cooperating relationship;

a spring mechanism having an upper arm and a lower arm, the spring mechanism secured to the upper housing portion and the lower housing portion between the tail portions thereto with the upper arm secured to an upper surface of the tail portion of the upper housing portion and the lower arm secured to a lower surface of the tail portion of the lower housing portion whereby the upper arm and the lower arm biasing the upper housing portion and the lower housing portion together to form the lure protecting cavity.

2. A fishing lure protective device comprising:

an upper housing portion having a closed upper end and an open lower end, the upper housing portion having a front wall, a rear wall and two side walls, the open lower end having a greater width than the closed upper end, the upper housing portion having a tail portion extending at an angle outwardly from the rear wall thereof;

a lower housing portion having an open upper end and a closed lower end, the lower housing portion having a front wall, a rear wall and two side walls, the open upper end having a greater width than the closed lower end, the lower housing portion having a tail portion extending at an angle outwardly from the rear wall thereof, the lower housing portion and the upper housing portion forming a lure protecting cavity when in a closed, cooperating relationship;

a spring mechanism secured to the upper housing portion and the lower housing portion between the tail portions thereof whereby the spring mechanism biasing the upper housing portion and the lower housing portion together to form the lure protecting cavity.

3. The device as set forth in claim 2 wherein the upper housing portion having apertures formed through the side walls thereof inwardly of the front wall, the apertures resembling eyes of a fish, the closed upper end having an elongated inscription thereon resembling a dorsal fin of a fish.

4. The device as set forth in claim 2 wherein the upper housing portion having an arcuate recess formed in a lower edge of the front wall thereof.

5. The device as set forth in claim 2 wherein the lower housing portion having an arcuate recess formed in an upper edge of a front wall thereof.

6. The device as set forth in claim 2 wherein the spring mechanism having an upper arm and a lower arm, the upper arm secured to an upper surface of the tail portion of the upper housing portion and the lower arm secured to a lower surface of the tail portion of the lower housing portion whereby the upper arm and the lower arm biasing the upper housing portion and the lower housing portion together to form the lure protecting cavity.

* * * * *